(12) United States Patent
Govindaraj et al.

(10) Patent No.: US 10,277,129 B2
(45) Date of Patent: *Apr. 30, 2019

(54) SWITCHING OVERLAP AVOIDANCE SYSTEM FOR CONTROLLING POWER SUPPLY SYSTEM

(71) Applicant: FORD GLOBAL TECHNOLOGIES, LLC, Dearborn, MI (US)

(72) Inventors: Arvind Govindaraj, Saginaw, MI (US); Jun Kikuchi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,638

(22) Filed: Nov. 29, 2017

(65) Prior Publication Data

US 2018/0083537 A1    Mar. 22, 2018

Related U.S. Application Data

(63) Continuation of application No. 14/088,687, filed on Nov. 25, 2013, now Pat. No. 9,853,544.

(51) Int. Cl.
*H02M 3/158* (2006.01)
*B60L 3/00* (2019.01)
(Continued)

(52) U.S. Cl.
CPC ............ *H02M 3/158* (2013.01); *B60L 3/003* (2013.01); *B60L 7/14* (2013.01); *B60L 11/123* (2013.01); *B60L 11/14* (2013.01); *B60L 15/2009* (2013.01); *B60L 15/2054* (2013.01); *H02M 1/32* (2013.01); *H02M 5/4585* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *H02M 1/38* (2013.01); *Y02T 10/6217* (2013.01); *Y02T 10/645* (2013.01); *Y02T 10/7005* (2013.01); *Y02T 10/7077* (2013.01); *Y02T 10/7216* (2013.01); *Y02T 10/7241* (2013.01); *Y02T 10/7275* (2013.01)

(58) Field of Classification Search
CPC .......... H02M 1/32; H02M 1/38; H02M 3/158; H02M 5/4585
See application file for complete search history.

(56) References Cited

U.S. PATENT DOCUMENTS 4,371,824 A    2/1983  Gritter
5,977,822 A *  11/1999 Rybicki .................. H03K 7/04
                                              329/311
(Continued)

FOREIGN PATENT DOCUMENTS

EP            2224124 A1    9/2010

*Primary Examiner* — Fred E Finch, III
*Assistant Examiner* — Rafael O. De León Domenech
(74) *Attorney, Agent, or Firm* — Carlson, Gaskey & Olds (57) ABSTRACT

A method includes controlling a power supply system to avoid an over-voltage event across one or more switching devices of the power supply system. The controlling is based on switching overlap information that includes instructions for either advancing or retarding a switching signal associated with at least one of the switching devices.

17 Claims, 4 Drawing Sheets

(51) Int. Cl.

| | | |
|---|---|---|
| *B60L 7/14* | (2006.01) | |
| *B60L 11/12* | (2006.01) | |
| *B60L 11/14* | (2006.01) | |
| *B60L 15/20* | (2006.01) | |
| *H02M 1/32* | (2007.01) | |
| *H02M 5/458* | (2006.01) | |
| *H02M 1/38* | (2007.01) | |

(56) References Cited

U.S. PATENT DOCUMENTS

| | | |
|---|---|---|
| 6,801,028 B2 | 10/2004 | Kernahan et al. |
| 8,261,105 B2 | 9/2012 | Su et al. |
| 8,289,010 B1 | 10/2012 | Fernald et al. |
| 2009/0121695 A1 | 5/2009 | Pierson et al. |
| 2011/0031942 A1 | 2/2011 | Green |
| 2011/0170318 A1 | 7/2011 | Chen |
| 2012/0104989 A1 | 5/2012 | Wu et al. |
| 2012/0257311 A1 | 10/2012 | Burns et al. |
| 2012/0274299 A1 | 11/2012 | Chang et al. |
| 2013/0155740 A1 | 6/2013 | Takubo |

\* cited by examiner

| SWITCHING SIGNAL (P) | PRIORITY VALUE (PPR) | PRIORITY |
|---|---|---|
| $P_1$ | $PPR_1$ | HIGHEST |
| $P_2$ | $PPR_2$ | |
| $P_3$ | $PPR_3$ | |
| ⋮ | ⋮ | ↓ |
| $P_n$ | $PPR_n$ | LOWEST |

FIG.6

SWITCHING OVERLAP AVOIDANCE SYSTEM FOR CONTROLLING POWER SUPPLY SYSTEM

CROSS REFERENCE TO RELATED APPLICATIONS

This is a continuation of U.S. patent application Ser. No. 14/088,687, which was filed on Nov. 25, 2013.

TECHNICAL FIELD

This disclosure relates to an electrified vehicle, and more particularly, but not exclusively, to a switching overlap avoidance system and method for avoiding an over-voltage event across one or more switching devices of a power supply system.

BACKGROUND

Hybrid electric vehicles (HEV's), plug-in hybrid electric vehicles (PHEV's), battery electric vehicles (BEV's), fuel cell vehicles and other known electrified vehicles differ from conventional motor vehicles in that they are powered by one or more electric machines (i.e., electric motors and/or generators) instead of or in addition to an internal combustion engine. High voltage and high current are typically supplied to the electric machines by one or more batteries that store electrical power.

Electrified vehicles typically employ power supply systems that support bi-directional power flow within the vehicle. The power supply systems include a plurality of switching devices that perform switching operations according to a drive signal produced by a controller to control a load. For example, electrified vehicles often include inverter/converter systems that utilize a plurality of semiconductor switching devices, such as power metal-oxide semiconductor field effect transistors (MOSFET's) or insulated gate bipolar transistors (IGBT's), that selectively undergo switching operations for powering one or more AC drive motors from a DC storage battery, or alternatively, to charge the DC storage battery from an AC source, such as a generator.

An over-voltage event can be caused by various factors, such as voltage-control delay and voltage sensor offset error, and may occur when a switching device of the power supply system undergoes switching operations between ON and OFF. This voltage-spike occurs due to the effect of a large rate of change of current during a switching event, i.e. di/dt, and parasitic inductance L (which can be formulated as V=L·di/dt).

The voltage spike issue described above may become more significant with modern power switching devices, which are generally capable of faster turn-on and turn-off (i.e., large di/dt). Switching power converters are typically designed to include a relatively large voltage margin so that such voltage spike can be maintained below the voltage rating of the switching device. However, in the case of multi-leg switching power converters, such as three-phase PWM inverters commonly used in utility, consumer and automotive applications, simultaneous switching events among two or more legs may lead to relatively large voltage spike across an individual device. This can result in relatively poor voltage rating utilization for multi-leg switching power converters.

SUMMARY

A method according to an exemplary aspect of the present disclosure includes, among other things, controlling a power supply system to avoid an over-voltage event across one or more switching devices of the power supply system, the controlling step based on switching overlap information that includes instructions for either advancing or retarding a switching signal associated with at least one of the switching devices.

In a further non-limiting embodiment of the foregoing method, the method includes the step of not modifying the switching signal if there is no risk of the over-voltage event.

In a further non-limiting embodiment of either of the foregoing methods, the step of advancing or retarding the switching signal includes advancing or retarding one or more pulse edges of the switching signal.

In a further non-limiting embodiment of any of the foregoing methods, the switching overlap information includes an estimate of a likelihood for a switching overlap to occur between two or more switching signals.

In a further non-limiting embodiment of any of the foregoing methods, the controlling step includes advancing a first pulse edge of the switching signal and delaying a second pulse edge of the switching signal.

In a further non-limiting embodiment of any of the foregoing methods, a third pulse edge of the switching signal is neither advanced nor delayed.

In a further non-limiting embodiment of any of the foregoing methods, the controlling step includes advancing pulse edges of the switching signal or retarding pulse edges of the switching signal.

In a further non-limiting embodiment of any of the foregoing methods, the controlling step includes determining a location of pulse edges of the switching signal and checking whether additional pulse edges are scheduled to occur in the vicinity of the pulse edges of the switching signal.

In a further non-limiting embodiment of any of the foregoing methods, the method includes invoking a pulse edge repositioning routine if the additional pulse edges are scheduled in the vicinity of the pulse edges of the switching signal.

In a further non-limiting embodiment of any of the foregoing methods, the method includes assigning a priority system in order to select which of a plurality of switching signals should be reconstructed.

A method according to another exemplary aspect of the present disclosure includes among other things, controlling a power supply system of a vehicle to avoid an over-voltage event across one or more switching devices of the power supply system by readjusting a switching signal in response to a switching overlap between two or more of the switching devices.

In a further non-limiting embodiment of the foregoing method, the over-voltage event includes a voltage spike that exceeds a voltage rating of the one or more switching devices.

In a further non-limiting embodiment of either of the foregoing methods, readjusting the switching signal includes advancing a pulse edge of the switching signal or retarding the pulse edge of the switching signal.

In a further non-limiting embodiment of any of the foregoing methods, the method includes ignoring the switching overlap if there is no risk of the over-voltage event.

In a further non-limiting embodiment of any of the foregoing methods, the controlling step includes advancing a first pulse edge of the switching signal and delaying a second pulse edge of the switching signal.

In a further non-limiting embodiment of any of the foregoing methods, the method includes the step of ignoring a third pulse edge of the switching signal.

In a further non-limiting embodiment of any of the foregoing methods, the switching overlap occurs when a first pulse edge of the switching signal occurs at the same time as a second pulse edge of a second switching signal.

In a further non-limiting embodiment of any of the foregoing methods, the method includes assigning a priority system in order to select which of a plurality of switching signals should be reconstructed.

In a further non-limiting embodiment of any of the foregoing methods, the controlling step includes determining a location of pulse edges of the switching signal and checking whether additional pulse edges are scheduled to occur in the vicinity of the pulse edges of the switching signal.

A power supply system according to another exemplary aspect of the present disclosure includes, among other things, a plurality of switching devices and a switching overlap avoidance system that monitors switching events of the plurality of switching devices, the switching overlap avoidance system configured to readjust one or more switching signals in response to a switching overlap between two or more of the plurality of switching devices in order to avoid an over-voltage event.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a switching overlap avoidance system and method for controlling a power supply system of an electrified vehicle. The inventive system predicts a switching overlap between two or more switching devices and modifies a switching signal associated with at least one of the switching devices in response to the detected switching overlap. The switching signals may be readjusted by advancing or retarding pulse edges, which represent turn on/turn off transients, in order to avoid an over-voltage event across one or more switching devices. A switching overlap identified by concurrent switching pulse edges can alternatively be ignored if there is no risk of an over-voltage event. These and other features are discussed in greater detail herein.

Figure 1:
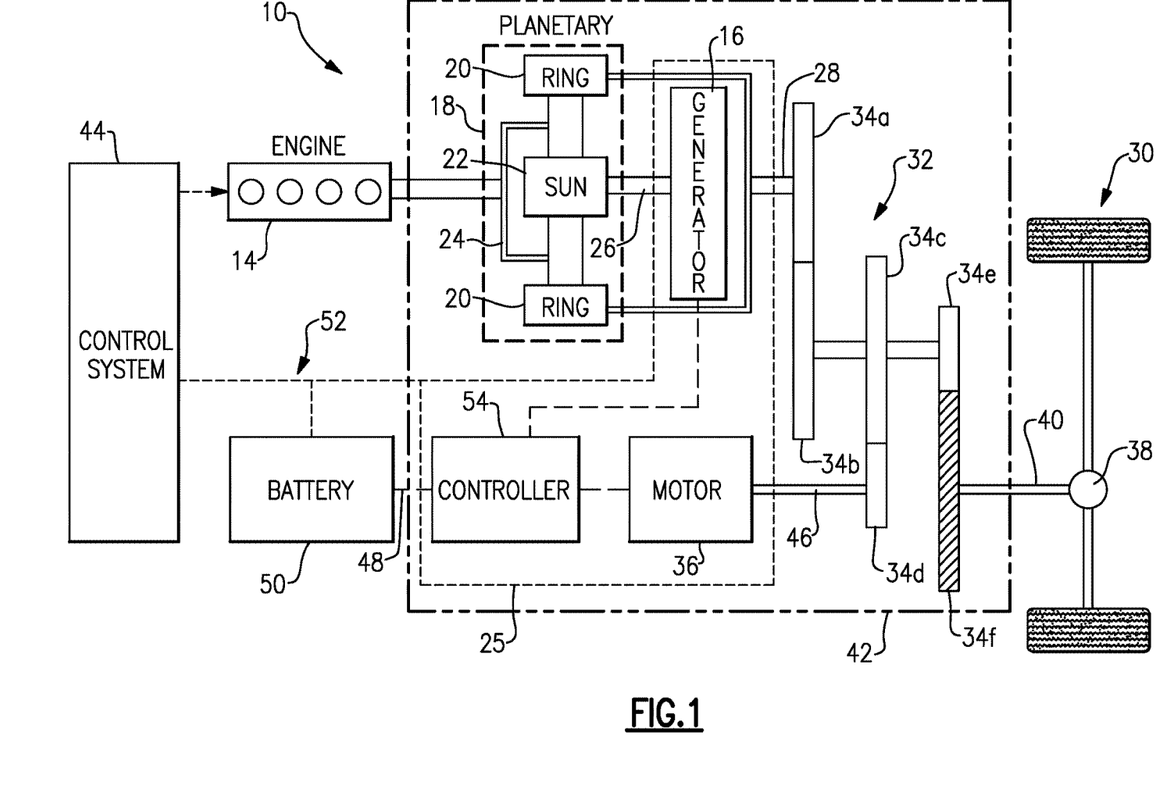
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, and fuel cell vehicles.

In one embodiment, the powertrain 10 is a power split system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50. The battery 50 may be a high voltage battery that is capable of outputting electrical power to operate the motor 36 and the generator 16. Other types of energy storage devices and/or output devices can also be incorporated for use with the electrified vehicle 12.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 could also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

Figure 2:
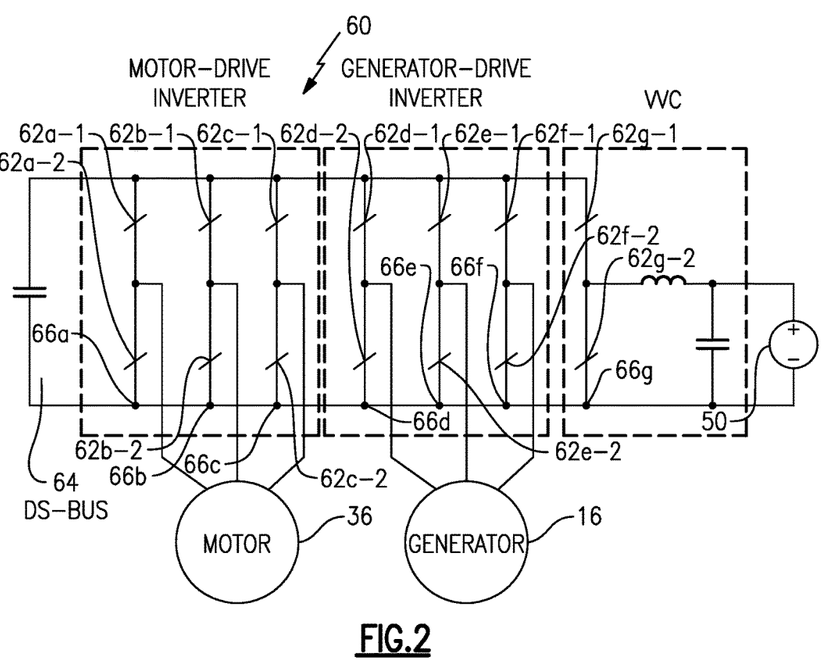
FIG. 2 illustrates a topology of a power supply system.

FIG. 2 illustrates a power supply system 60 that can be incorporated into an electrified vehicle. For example, the power supply system 60 may include an inverter system, a converter system, or a combined voltage converter/inverter of the electrified vehicle 12 of FIG. 1. In one embodiment, the power supply system 60 includes a motor-drive inverter, a generator-drive inverter and a variable voltage converter (VVC). The power supply system 60 outputs power for controlling loads, such as a motor 36 and a generator 16, by switching one or more switching devices 62.

In one embodiment, the power supply system 60 includes multiple switching devices 62. The switching devices 62 may undergo switching operations (i.e., toggling between ON and OFF) to power the loads using energy from the battery 50, or alternatively, to charge the battery 50 over a DC bus 64. In one embodiment, the switching devices 62 are IGBT's. In another embodiment, the switching devices 62 are power MOSFET's. Other switching devices and other configurations of the power supply system 60 are contemplated as within the scope of this disclosure.

The power supply system 60 may include multiple legs 66 of switching devices 62 that are connected in parallel. Each leg 66 includes first and second switching devices $62_{a,b,c,d,e,f,g\text{-}1}$, $62_{a,b,c,d,e,f,g\text{-}2}$ connected in series, respectively. The number of legs 66 provided may correspond to the total number of phases of the loads and sources, which is in one embodiment a three phase motor 36, a three phase generator 16 and a battery 50. Accordingly, in one embodiment, the power supply system 60 includes seven legs 66a, 66b, 66c, 66d, 66e, 66f and 66g of switching devices 62 for controlling the power flow among the loads and the source. It should however be appreciated that the power supply system 60 could include any number of legs of switching devices for powering loads having any number of phases.

In one embodiment, the switching devices $62_{a,b,c,d,e,f,g\text{-}1}$, $62_{a,b,c,d,e,f,g\text{-}2}$ of each leg 66a to 66g may be alternatively switched between ON and OFF positions to convert DC power to three phase AC power to drive the motor 36 and the generator 16, or to convert to a different voltage-level of DC power to the high voltage battery 50. A switching overlap can occur during the switching events of the various switching devices 62, which can lead to an over-voltage event (i.e., a voltage spike that exceeds the voltage rating of the switching device 62) across one or more of the switching devices 62. As discussed in greater detail below, an exemplary system and method for predicting switching overlap and readjusting switching signals to avoid the switching overlap can be used to control the power supply system 60 and thereby avoid over-voltage events.

Figure 3:
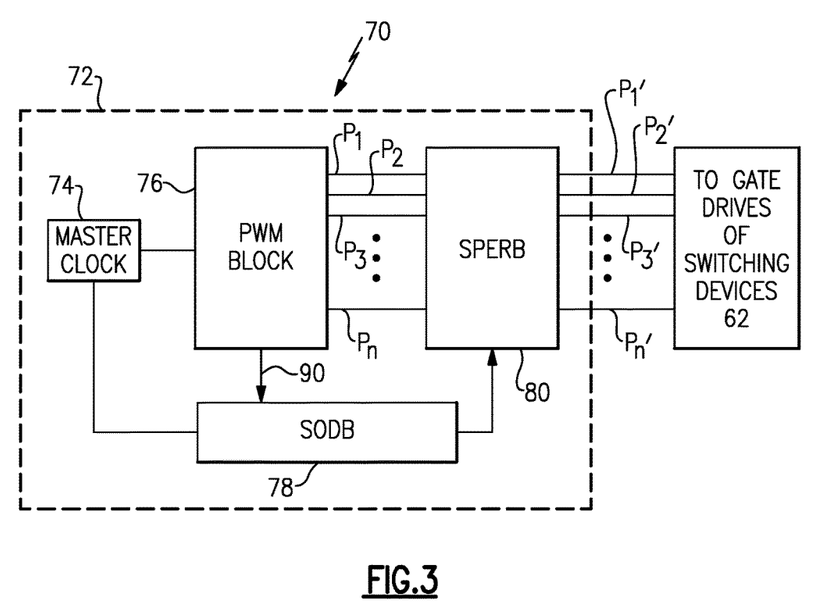
FIG. 3 illustrates a switching overlap avoidance system that can be used to control the power supply system of FIG. 2.

FIG. 3 illustrates a switching overlap avoidance system 70 that can be used to control the power supply system 60 of FIG. 2. In one embodiment, the switching overlap avoidance system 70 is part of a controller 72 of the power supply system 60. As can be appreciated, in one embodiment, the switching overlap avoidance system 70 is implemented as software on the controller 72. For example, the switching overlap avoidance system 70 may employ one or more algorithms programmed into the controller 72 in order to predict and avoid switching overlaps. Alternatively, in another embodiment, the switching overlap avoidance system 70 could be implemented as custom designed hardware circuitry of the power supply system 60.

Figure 5A:
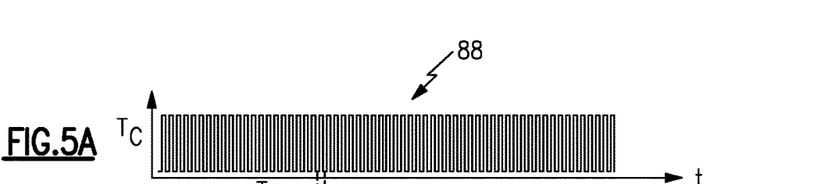
FIGS. 5A, 5B, 5C and 5D schematically illustrate a method for detecting switching signal overlaps using the switching overlap avoidance system of FIG. 3.

The exemplary switching overlap avoidance system 70 includes a master clock 74, a pulse-width modulation (PWM) block 76, a switching overlap detection block (SODB) 78, and a switching pulse edge repositioning block (SPERB) 80. The master clock 74 provides a time reference for the switching overlap avoidance system 70. In one embodiment, the master clock 74 creates a stream of pulses that are in the form of a square wave (see graph (a) of FIG. 5). Other clock signal formats are also contemplated within the scope of this disclosure.

The PWM block 76 generates switching signals $P_1$ to $P_n$ for controlling switching operations of the switching devices 62 of the power supply system 60. The switching signals $P_1$ to $P_n$ are derived from the master clock 74 and may be generated as integer multiples of the master clock 74 tick. The switching signals $P_1$ to $P_n$ include switching event information for controlling the switching devices between ON and OFF positions.

In one embodiment, the SODB 78 can predict switching overlaps by monitoring the PWM block 76 with a timing circuit driven by the master clock 74. The SPERB 80 can then reschedule overlapping pulse edges of the switching signals $P_1$ to $P_n$ and communicate readjusted switching signals $P_1'$ to $P_n'$ to the gate drives of the switching devices 62. The SPERB 80 can reschedule one or more of the switching signals $P_1$ to $P_n$ by advancing or retarding the pulse edges of these signals. The total pulse width of the switching signals $P_1'$ to $P_n'$ may be impacted by this readjustment. Between the SODB 78 and the SPERB 80, it is ensured that the repositioned pulse edges of the switching signals $P_1$ to $P_n$ do not cause an unintended switching overlap.

Figure 4A:
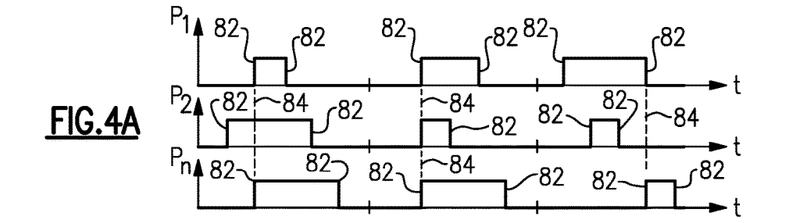
FIGS. 4A and 4B are graphical representations of switching signals measured over time that control switching operations of a power supply system.

FIG. 4 (with continued reference to FIG. 3) schematically illustrates the basic principle of operation of the switching overlap avoidance system 70. The PWM block 76 may generate any number of switching signals $P_1$ to $P_n$ over a time t which may be subsequently communicated to the gate drives of the switching devices 62 for commanding various switching events. The SODB 78 locates pulse edges 82 (i.e., rising edges or falling edges) associated with each switching signal $P_1$ to $P_n$ and estimates whether there is likelihood for a switching overlap 84 to occur between two or more of the switching signals $P_1$ to $P_n$. The switching overlap 84 may occur when a pulse edge 82 of one of the switching signals $P_1$ to $P_n$ occurs at the same time as another pulse edge 82 from another switching signal $P_1$ to $P_n$. This is shown in graph (a) of FIG. 4.

Figure 4B:
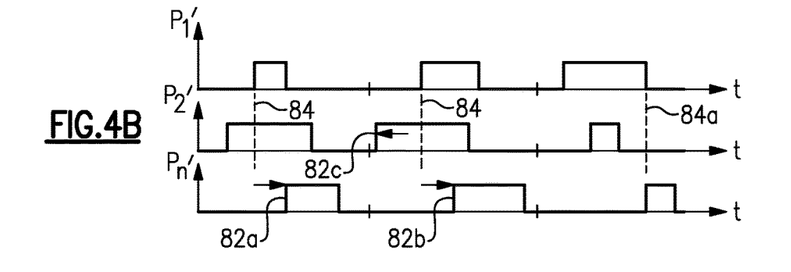

The switching overlap information may be communicated from the SODB 78 to the SPERB 80. If there is a potential for one or more switching overlaps 84, the SPERB 80 is configured to readjust one or more of the switching signals $P_1$ to $P_n$ to eliminate switching overlap. This is shown in graph (b) of FIG. 4. In one embodiment, the SPERB 80 may readjust the switching signals $P_1$ to $P_n$ by advancing or delaying the pulse edge(s) 82 associated with one or more of the switching signals $P_1$ to $P_n$ to create readjusted switching signals $P_1'$ to $P_n'$. Pulse edges 82a and 82b of readjusted switching signal $P_n'$ are examples of retarded signals and pulse edge 82c of readjusted switching signal P2' is an example of a signal that has been advanced because of a potential for a switching overlap. The readjusted signals $P_1'$ to $P_n'$ avoid switching overlap that can result in over-voltage events.

In another embodiment, if it is determined by the switching overlap avoidance system 70 that a particular switching overlap 84 does not present a risk of an over-voltage event, the switching overlap 84 can be ignored (see, for example, switching overlap 84a associated with unchanged switching signal $P_1'$ and $P_n'$). For example, if the dc-bus voltage is low enough even when the overlapped voltage spikes are taken into account, the switching overlap event can be ignored because there is no concern to have an overvoltage going beyond the power device voltage rating in such an instance. Another non-limiting instance in which a switching overlap 84 may be ignored is where the overlap occurs between a switching event that is ending and a switching event that is beginning. In yet another embodiment, any combination of advancing, delaying or not changing the positioning of the pulse edges 82 may be used to readjust the switching signals $P_1$ to $P_n$.

Figure 5B:
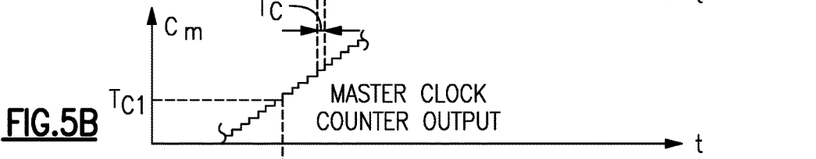
Figure 6:
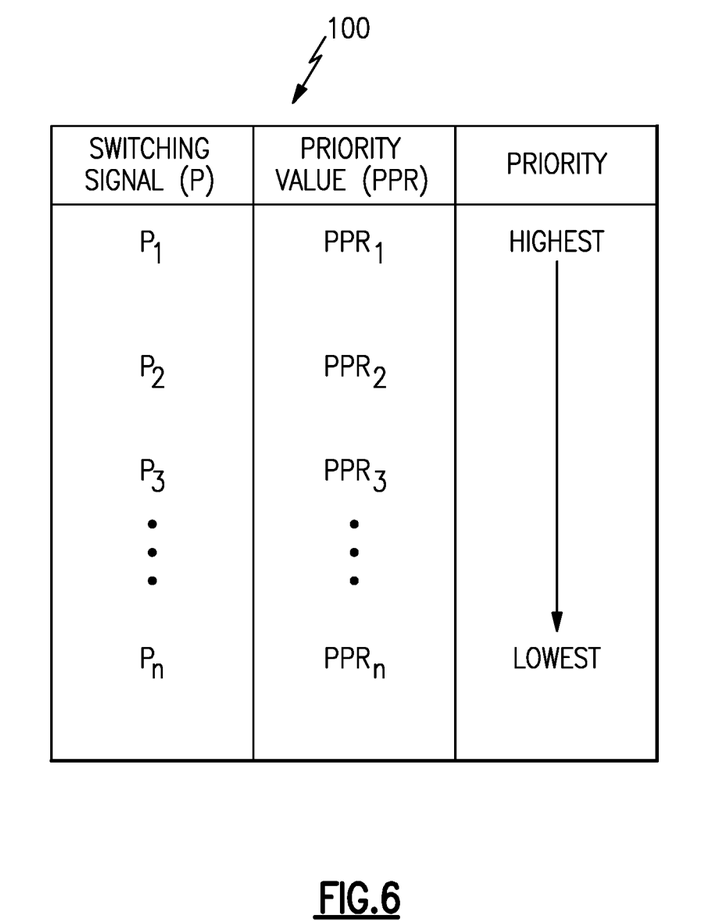
FIG. 6 schematically illustrates a priority system of the switching overlap avoidance system of FIG. 3.

FIGS. 5 and 6, with continued reference to FIGS. 1-4, describe, in greater detail, a method for controlling the power supply system 60 using the switching overlap avoidance system 70 described above. Referring first to FIG. 5, the master clock 74 creates a stream of pulses 88 (graph (a) of FIG. 5) and drives a counter $C_m$ (graph (b) of FIG. 5), which may be part of the PWM block 76. The counter $C_m$ increments every clock tick $T_c$ of the master clock 74 to provide a time reference for the switching overlap avoidance system 70. In other words, the counter $C_m$ counts the stream of pulses 88 generated by the master clock 74.

In one embodiment, it is assumed that the PWM block 76 produces a center aligned asymmetrical modulation (switching) signal. However, other PWM implementations are also contemplated within the scope of this disclosure.

Figure 5C:
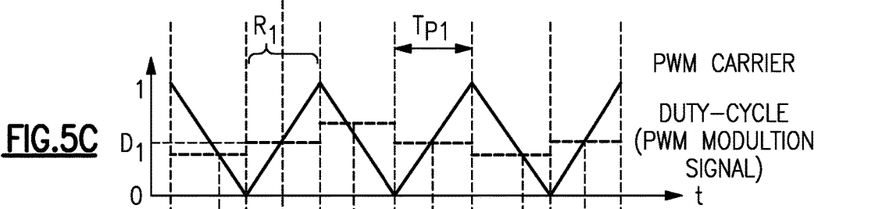
Figure 5D:
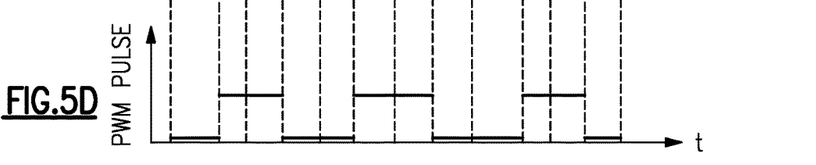

FIG. 5(c) illustrates how a PWM switching pulse for a particular leg (i.e., one of the legs 66a, 66b, 66c, 66d, 66e, 66f and 66g of FIG. 2) is generated in the PWM block 76 in FIG. 3. Each routine is triggered at every peak and valley of the triangular PWM carrier based on the assumption of the center-aligned asymmetric PWM scheme. The PWM carrier is generated with an up-down counter which is a part of the PWM block 76 driven by the master clock 74. A specific half carrier cycle is employed, in one embodiment, and is specified as R1 in FIG. 5(c). At the beginning of the half carrier cycle, the duty-cycle (or equivalently, the PWM modulation signal) is updated. The duty cycle value is the outcome of a current, torque or predetermined control strategy. The PWM modulation signal is compared with the PWM carrier and the switching moment for this particular carrier half-cycle is determined. This routine repeats cycle-by-cycle and a PWM pulse train is generated as shown in FIG. 5(d). This pulse can be interpreted as one of $P_1, P_2, \ldots, P_n$ in FIG. 2 and FIG. 3.

The same routine is applied to all the legs 66 of the power supply system 60 of FIG. 2. In one embodiment, the SODB 78 calculates the next up-coming switching instant based on the updated duty-cycle value and the half carrier cycle period as follows:

$$T_{C1} = D_1 * T_{p1} \tag{1}$$

where $$T_{p1} = n * T_c,$$

n is an integer value of the number of cycles corresponding to the half PWM carrier cycle, and
$T_c$ is the master clock period.

In another embodiment, the SODB 78 may calculate the next switching instant by referring to the corresponding master clock 74 counter value $T_{C1}$. The SODB 78 compares the switching instants based on the time-base provided by the master clock 74 counter $C_m$, and detects the possibility of switching overlap among two or more multiple legs 66.

If a switching overlap is detected, the routine $R_1$ may invoke a pulse edge repositioning routine for readjusting one or more switching signals. This routine is executed in the SPERB 80.

The SPERB 80 may function to reposition one or more pulse edges of conflicting switching signals while trying to preserve the wave shape of the switching signals. The pulse edge(s) may be either advanced or retarded depending on the overall impact such changes may have on the shape of the switching signals. Alternatively, a pulse edge overlap could be ignored where it is determined by the controller 72 that the switching device 62 is not at risk for an over-voltage event. It is noted that over-voltage events generally do not occur under low load currents or low dc-bus voltages.

In one embodiment, illustrated in FIG. 6, the SPERB 80 utilizes a priority system 100 in order to select which switching signal(s) should be readjusted. A priority value $PPR_1$ to $PPR_n$ may be assigned to each switching signal $P_1$ to $P_n$. In one embodiment, the priority value $PPR_1$ is given the highest priority, whereas each subsequent priority value $PPR_2$ to $PPR_n$ is given a lower priority than the previous priority value. The switching signals P with the lowest priority, such as signal $P_n$ in this example, are the most likely to be repositioned, whereas the highest priority signals (i.e., $P_1$ in this example) will be unaltered. The priority of the signals may be calculated and assigned to achieve the least amount of distortion to the output current wave form of the switching signals $P_1$ to $P_n$. The SPERB 80 could be programmed to store, dynamically estimate/calculate, or otherwise access the priority system 100 for use in reconstructing switching signals $P_1$ to $P_n$ in response to a switching overlap.

In one embodiment, the following information may be used to calculate and assign the priority values $PPR_1$ to $PPR_n$:

1. Current sensor readings;
2. Knowledge of the modulation strategy;
3. Bus bar geometry; and
4. Channel propagation characteristics.

Of course, other information may also be used to establish the priority system 100.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    controlling a power supply system to avoid an over-voltage event across one or more switching devices of the power supply system, the controlling step based on switching overlap information that includes instructions for advancing one or more pulse edges of a switching signal associated with at least one of the switching devices,
    wherein the switching signal includes multiple sets of rising edges and falling edges, wherein advancing the one or more pulse edges of the switching signal includes advancing a first rising edge or a first falling edge, but not both, of a first set of the multiple sets.

2. The method as recited in claim 1, comprising not modifying the switching signal if there is no risk of the over-voltage event.

3. The method as recited in claim 1, wherein the controlling step includes:
    advancing a first pulse edge of the switching signal; and
    delaying a second pulse edge of the switching signal.

4. The method as recited in claim 3, wherein a third pulse edge of the switching signal is neither advanced nor delayed.

5. The method as recited in claim 1, wherein the controlling step includes:
    determining a location of the one or more pulse edges of the switching signal; and
    checking whether additional pulse edges are scheduled to occur in the vicinity of the one or more pulse edges of the switching signal.

6. The method as recited in claim 5, comprising invoking a pulse edge repositioning routine if the additional pulse edges are scheduled in the vicinity of the pulse edges of the switching signal.

7. The method as recited in claim 1, comprising assigning a priority system in order to select which of a plurality of switching signals should be reconstructed.

8. The method as recited in claim 7, comprising adjusting the switching signal having the lowest priority and leaving the switching signal having the highest priority unaltered.

9. The method as recited in claim 1, wherein controlling the power supply system includes calculating the next upcoming switching instant for each leg of the power supply system based on an updated duty cycle value and a half carrier cycle period.

10. The method as recited in claim 1, comprising prioritizing one switching signal over another based on sensor readings or channel propagation characteristics when determining which switching signal should be advanced.

11. The method as recited in claim 1, wherein the controlling step includes:
    determining whether the one or more pulse edges that are advanced cause an unintended switching overlap; and if so,
    repositioning the one or more pulse edges that were previously advanced.

12. A method, comprising:
    controlling a power supply system of a vehicle by automatically readjusting a switching signal in response to a switching overlap between two or more switching devices of the power supply system when a voltage spike exceeds a voltage rating of at least one of the two or more switching device,
    wherein the switching signal includes multiple sets of rising edges and falling edges, wherein automatically readjusting the switching signal includes advancing a first rising edge or a first falling edge, but not both, of a first set of the multiple sets or altering an amount of time between the first rising edge and the first falling edge of the first set of the multiple sets.

13. The method as recited in claim 12, wherein the controlling step includes:
    advancing a first pulse edge of the switching signal; and
    delaying a second pulse edge of the switching signal.

14. The method as recited in claim 13, comprising the step of ignoring a third pulse edge of the switching signal.

15. The method as recited in claim 12, comprising assigning a priority system in order to select which of a plurality of switching signals should be reconstructed.

16. The method as recited in claim 12, wherein the controlling step includes:
    determining a location of pulse edges of the switching signal; and
    checking whether additional pulse edges are scheduled to occur in the vicinity of the pulse edges of the switching signal.

17. A method, comprising:
    controlling a power supply system to avoid an over-voltage event across one or more switching devices of the power supply system, the controlling step based on switching overlap information that includes instructions for advancing one or more pulse edges of a switching signal associated with at least one of the switching devices,
    wherein the switching signal includes multiple sets of rising edges and falling edges, wherein advancing the one or more pulse edges of the switching signal includes altering an amount of time between a first rising edge and a first falling edge of a first set of the multiple sets.

* * * * *